Dec. 20, 1966 C. J. STEPHENS ETAL 3,292,885
STORAGE MEANS FOR ELECTRIC KNIFE
Filed Feb. 12, 1965 2 Sheets-Sheet 1
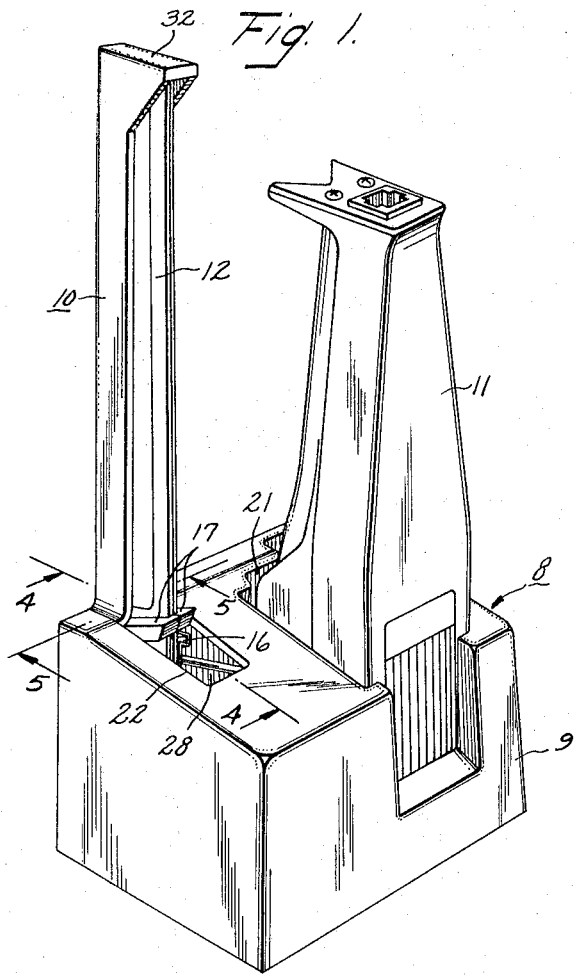
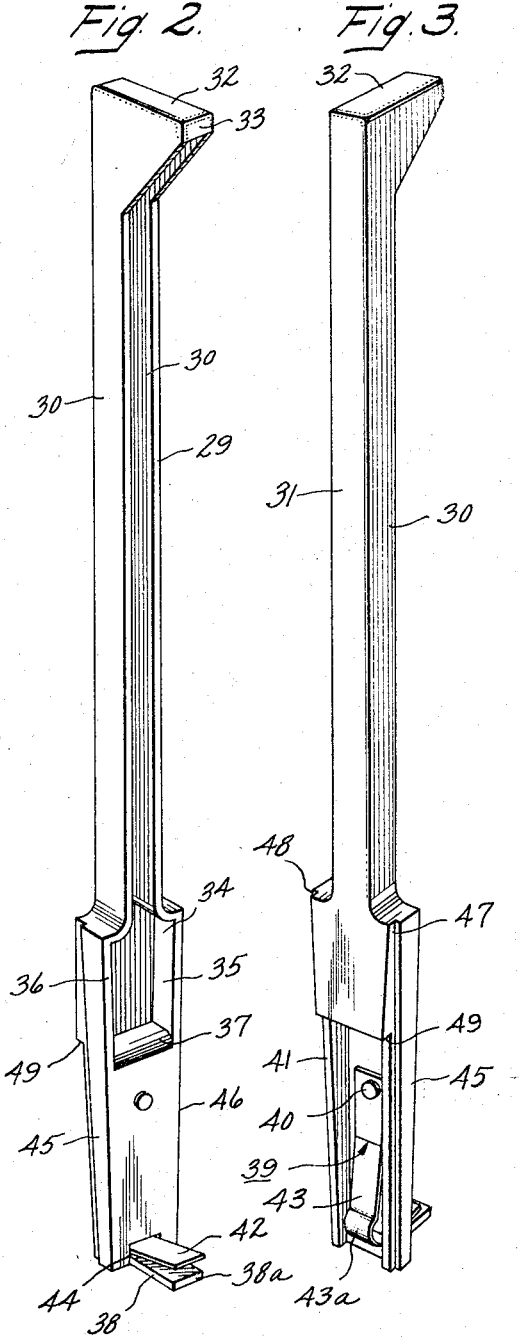
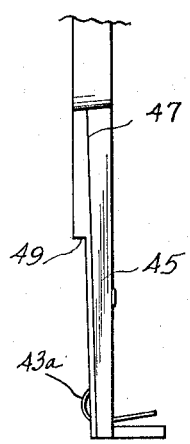
Inventors:
Carl J. Stephens,
John C. Shalvoy,

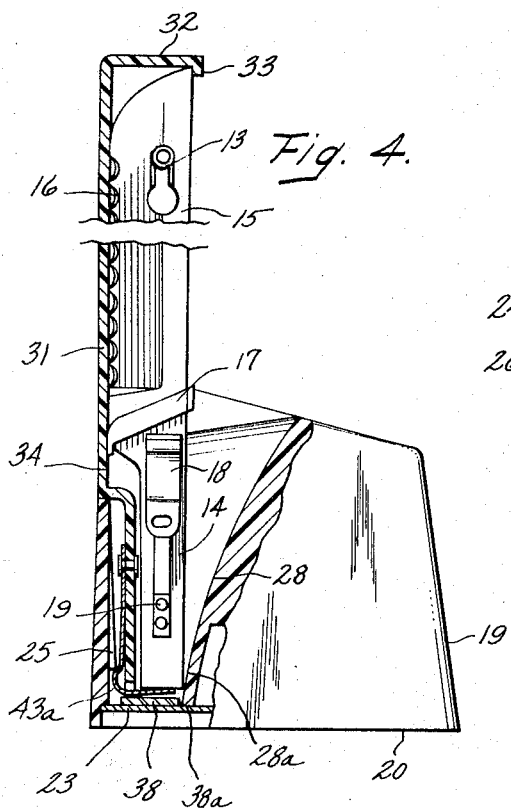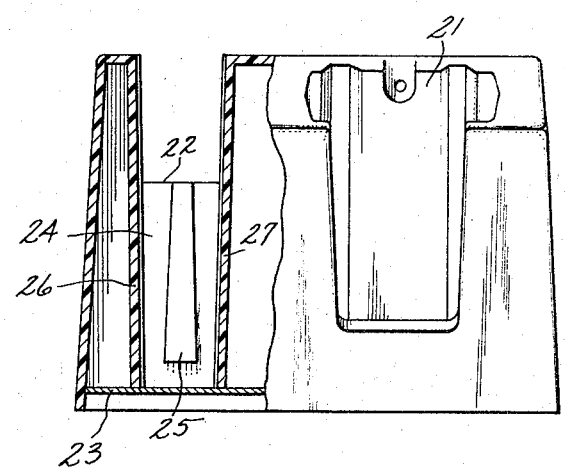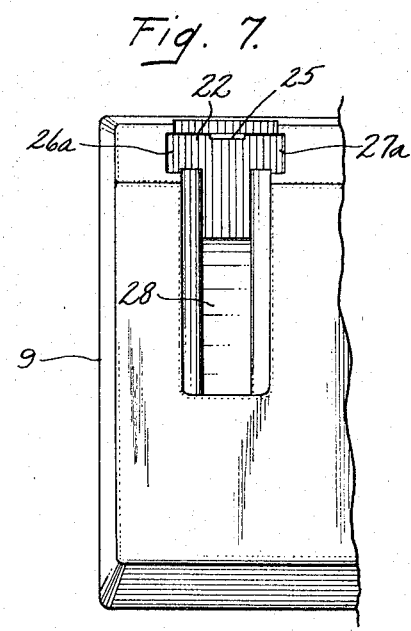

United States Patent Office 3,292,885
Patented Dec. 20, 1966

3,292,885
STORAGE MEANS FOR ELECTRIC KNIFE
Carl J. Stephens, Batavia, N.Y., and John C. Shalvoy, Fairfield, Conn., assignors to General Electric Company, a corporation of New York
Filed Feb. 12, 1965, Ser. No. 432,331
12 Claims. (Cl. 248—37.3)

This invention is directed to storage means for an electric knife and in particular to such means for the storage of an electric knife having cutting blades which are separable from the knife handle.

The success of the electric knife as a household kitchen appliance has been due in large part to the realization by the consumer of the many every-day uses to which an electric knife can be put. Most electric knives presently being marketed include a motor-containing handle and a pair of counter-reciprocating blades which are commonly separable from the knife handle and from one another. Therefore, in order to insure that the consumer obtain maximum utilization of the electric knife, it is desirable to provide a storage arrangement which permits convenient safe access to the knife handle and blades. This is particularly apparent with battery-operated knives for which a suitable battery charging means must also be provided for the knife handle.

In the interest of convenience and safety, it is also preferable to store the blades in their joined relationship. This requires that the blades be firmly held in the storage means and that accidental separation of the blades from one another be prevented.

Due to the sharpness of the blades commonly used and the difficulties of handling two relatively movable blades, some danger exists in the convenient handling of the blades. Consequently, it is also desirable to provide a protective element in which the blades may be conveniently stored or handled.

Accordingly, it is one object of this invention to provide a convenient storage arrangement for the handle and blades of an electric knife.

It is another object of this invention to provide storage means for electric knife blades in which the blades are safely and securely held in an accessible stored position.

It is a further object of this invention to provide a protective element which may be used for supporting a pair of knife blades in a storage rack or for carrying the knife blades separately from the rack.

In carrying out the objects of this invention in one form thereof, a storage rack is provided having a handle socket which is adapted to receive the handle of an electric knife and a blade holder socket in which the knife blades may be positioned. A blade holder which may be secured to the rack extends upwardly from the blade holder socket to provide a protective covering for the blades when they are vertically oriented within the socket. Means are provided within the blade holder socket to support the knife blades and to resiliently secure the blades within the blade holder.

As another aspect of this invention, the blade holder is separable from the storage rack, being adapted for separate storage or safe transport of the blades. This separable blade holder includes a channel portion which receives the cutting edges of the knife blades and lower walls which are closely accommodated within the blade holder socket of the knife storage rack.

As yet another feature of this invention, a spring element having an engaging portion and a resilient supporting portion is secured to the separable blade holder. The engaging portion is adapted to engage means within the blade holder socket, and the supporting portion acts to firmly support the knife blades within the blade guard in a readily removable position.

Other objects and advantages of our invention may best be understood by reference to the following description taken in connection with the accompany drawings in which:

FIG. 1 is a perspective view of the electric knife storage rack and blade holder showing the knife handle and knife blades in their stored positions;

FIG. 2 is a front perspective view of the separable blade holder of FIG. 1;

FIG. 3 is a rear perspective view of the blade holder;

FIG. 4 is a side view in partial section of the storage rack of FIG. 1 showing the knife blades in their stored position;

FIG. 5 is a front view in partial section of the storage rack of FIG. 1;

FIG. 6 is a partial side view of the lower portion of the blade holder; and

FIG. 7 is a partial plan view of the storage rack.

FIG. 1 of the drawing shows a storage rack, designated generally as 8, comprising a casing 9 and a blade guard or holder 10. The rack is adapted to receive and store an electric knife handle 11 and a pair of knife blades 12 in generally vertical positions. The rack may take the form of a combined storage rack and battery charging unit as described in the co-pending Freeman et al. application, Serial No. 401,155, filed October 2, 1964, and assigned to the assignee of the present application; in which case rack 8 would include suitable recharging elements for charging batteries housed in handle 11. However, it is not intended that this invention should be limited to a storage rack for a battery-operated electric knife.

The knife blades and the storage rack may best be seen in FIGS. 4, 5 and 7. Generally, the blades to be stored may be of the type shown in co-pending application, Serial No. 298,303, Beisheim et al., filed July 29, 1963, now Patent No. 3,198,998, assigned to the assignee of the present application. These blades are adapted for connection to the knife drive mechanism (not shown) within the handle 11 and are removably connected to one another by a conventional rivet and keyhole arrangement as shown at 13. Each blade comprises a rearward tang portion 14 and a forward cutting portion 15 having a scalloped lower cutting edge 16. Mounted adjacent the rearward portion of each blade may be a deflector 17 which prevents the flow of foreign matter rearwardly along the outer faces of the knife blades. For the removable connection of the blades to the knife drive mechanism, a suitable resilient latching element 18 is secured to the tang portion of each knife blade as at 19.

The rack casing 9 is preferably an integrally molded unit of suitable thermoplastic material. Lower surfaces 20 of the casing walls are in a common plane permitting the placement of the rack on a flat surface such as a kitchen counter. A pair of sockets 21 and 22 are formed in the housing vertical positioning of the knife handle and blades, respectively. A flat plate 23 is used to close the bottom of the rack casing, providing a lower wall for socket 22. Of particular interest in this invention is the design of socket 22 which accommodates blade holder 10 as well as the knife blades.

Socket 22 is defined by a rearward wall 24 having a forwardly extending tapered projection 25 formed thereon and a pair of vertically tapered side walls 26 and 27. A forward wall 28 (see FIG. 4) of socket 22 provides a large forwardly extending opening for the socket and slopes downwardly and rearwardly to provide a lower blade-abutting portion at 28a. The enlarged forward portion of the socket opening permits convenient insertion of the knife blade into the socket.

In accordance with our invention, blade holder 10 extends upwardly from socket 22 to accommodate the knife blades 12. While it may be seen that the blade holder could be formed as an integral portion of rack housing 9, important advantages are present in the preferred form of a separable blade holder as shown in FIGS. 2-4 and 6. The blade holder may be a molded piece formed of a thermoplastic material similar to that of housing 9.

In order to provide a protective sheath for the edges 16 of the blades a channeled portion 29 is formed in the blade holder. This channel portion is defined by a pair of vertical side walls 30 and a rear wall 31, the side walls being spaced a distance slightly greater than the width of the pair of knife blades when connected in sliding contact with one another. Adjacent the top of channeled portion 29, a top wall 32 is integrally formed to cover the tip of the knife blades. A forward downwardly depending wall or flange 33 is spaced from wall 32 approximately the edge-to-edge height of the knife blades. As is apparent in FIG. 4, flange 33 and abutment 28a cooperate to confine the blades within the channeled portion of the blade holder.

At the bottom of channeled portion 29 an enlarged recess 34 is formed having side walls 35 and 36 and a bottom wall 37. This recess is adapted to receive deflectors 17 which are secured to the outer face of each of the knife blades. The knife blades are confined vertically in the blade holder between a lower wall 38 which is formed at the bottom of the blade holder generally parallel to the top wall 32 and spaced therefrom a distance slightly greater than the length of the knife blades.

To insure firm but conveniently removable positioning of the blades in the blade holder, and to secure the blade holder in socket 22, a resilient spring element 38 is provided. Spring 39 is generally L-shaped, having a horizontal leg 42 and a vertical leg 43 which is secured in any suitable fashion, as at 40, with a rearward recess 41 of the blade holder. The horizontal leg extends through an aperture 44 formed at the lower end of the blade holder immediately above wall 38. Spring leg 42 is biased so that when the knife blades are positioned with their cutting edges in channeled portion 29 and the deflectors in recess 34, the blades are pressed upwardly with the blade points abutting top wall 32.

The generally vertical spring leg 43 includes a projection or engaging portion 43a which extends somewhat rearwardly and is arcuate in form. This projecting portion of spring 39 cooperates with the rear wall of the blade holder socket of the rack in the following manner.

Upon insertion of the blade holder into socket 22, spring projection 43a rides along rear wall projection 25 pressing the vertical spring leg 43 forwardly. When the blade holder is fully seated in the socket, projection 43a snaps rearwardly beneath the bottom edge of wall projection 25 as seen in FIG. 4. In this fashion, vertical movement between the blade holder and the rack cannot take place without a positive upward pulling force being applied to the blade holder which is sufficient to force projection 43a out from beneath wall projection 25.

To further assist in securing the blade holder in the blade holder socket, the lower wall portions of the blade holder are formed for close fitting with the walls defining the blade holder socket. Preferably, the lower side walls 45 and 46 of the blade holder are tapered inwardly from top to bottom and are offset as at 47 and 48 for close sliding fit within a pair of opposing slots 26a and 27a formed respectively in socket side walls 26 and 27 (see FIG. 7). Additionally, the rear wall is indented or notched at 49 so that the bottom surface of rear holder wall 31 rests along the top edge of rear wall 24 of the blade holder socket. Furthermore, holder bottom wall 38 extends forwardly so that its forward edge 38a is closely adjacent lower portion 28a of socket wall 28.

Therefore, it can be seen that the blade holder socket walls and the blade holder including spring 39 are adapted for firm but easily separable connection when the holder is fully seated in the socket. Blade holder 10 is prevented from lateral, forward or rearward motion with respect to the blade holder socket and an upward pulling force on the blade holder is necessary for any relative vertical movement.

With the blade holder in its seated position within its respective rack socket, the knife blades 12 may be conveniently inserted and removed from the blade holder and socket without removing the blade holder from the socket. Merely by inserting the rearward tang portions of the blades into socket 22 with the cutting portions of the blades positioned in channel 29, the blades can be safely and firmly supported. During this insertion, the rearward edge of the blade tangs engage the top surface of spring leg 42 and the application of slight downward pressure will permit the forward tip of the blades to move behind forward wall 33. This results in the application of the resilience of the latch spring to bias the blades upwardly against the upper wall 32.

When safe handling of the knife blades is paramount, or for cleansing of the blade holder, the knife blades and the blade holder may be removed from the blade socket of the rack together. When this is done, the blade holder acts as a sheath or carrying medium for the knife blades. When the blade holder, carrying the knife blades is returned to the rack, the action of rear wall projection 25 upon the projecting portion 43a of the spring forces the leg 42 of the spring to press the blades upwardly against the top wall of the blade holder.

In addition to the function of the socket walls in holding the blade holder in place, the configuration of these walls is of particular assistance in achieving other desired results of this invention. The rounded forward wall 28 acts as a guide in insuring proper placement of the rearward end of the blades downwardly within the socket and the elongated configuration of the top entrance of the socket prevents the blade deflectors 17 from interfering with the smooth movement of the blades into the socket. Also, the enlarged top portion of the socket permits greater cleanability of the socket by the user.

With the removable blade holder, safe carrying of the knife blades as well as cleanability of the blade holder and of the blade holder socket is also simplified. It has also been found that the knife blades may be held in their joined relationship within the blade holder, the resilient mounting preventing any rattling between the blades themselves or between the blades and the blade holder. The removable feature of our invention also facilitates packaging and shipment of the rack and holder.

We have thus provided a novel storage rack for an electric knife having a pair of sockets adapted to hold, in a convenient vertical orientation, the handle and a pair of separable knife blades. While we have thus shown and described a specific embodiment of this invention, we do not desire our invention to be limited to the particular construction shown and described. Instead it is the aim of the appended claims to cover all such equivalent variations as come within the true spirit and scope of the foregoing disclosure.

What is claimed is:

1. In a storage rack for an electric knife having a handle and a separable knife blade, said rack having a handle socket for supporting the knife handle in a generally vertical position, means for supporting the knife blade comprising:

(a) a blade holder socket;
  (b) an elongated blade holder secured to said rack and extending upwardly from said blade holder socket for supporting a knife blade in a generally vertical position, said holder including a top wall;
  (c) and means positioned within said blade holder socket spaced vertically from said holder top wall approximately the length of a knife blade for supporting a blade between said last-named means and said top wall.

2. A storage rack for an electric knife having a handle and a knife blade comprising:
  (a) a handle socket for supporting a knife handle in a generally vertical position;
  (b) a blade holder socket;
  (c) an elongated blade holder secured to said rack and extending upwardly from said blade holder socket for supporting a knife blade in a generally vertical position;
  (d) a top wall formed on said blade holder; and
  (e) resilient means within said blade holder socket for biasing a knife blade upwardly against said top wall.

3. In a storage rack for an electric knife having a handle and a knife blade, said rack having a handle socket for receiving a knife handle, means for supporting the knife blade comprising;
  (a) a blade holder socket;
  (b) connection means within said blade holder socket;
  (c) an elongated blade holder adapted for vertical positioning in said blade holder socket and including;
    (aa) a top wall,
  (d) a resilient element within said blade holder socket for connecting said blade holder to said rack and for biasing a knife blade upwardly against said top wall when said blade holder is positioned in said blade holder socket.

4. Storage means for a knife blade comprising:
  (a) a housing;
  (b) means in said housing forming a socket including integral projection receiving means;
  (c) an elongated blade holder adapted for vertical positioning in said socket and including:
    (aa) a rearward wall,
    (bb) a top wall, and
    (cc) a resilient latch element;
  (d) said latch element having a projecting portion and a resilient supporting portion;
  (e) said projecting portion being adapted to extend into said integral projection receiving means of said socket when said blade holder is inserted in said socket;
  (f) said supporting portion being spaced from said top wall and arranged so that the blade may be resiliently secured between said latch supporting portion and said top wall.

5. A holder for a knife blade having a cutting edge comprising:
  (a) a carrier element including:
    (aa) a channel portion having a rear wall adapted to receive the cutting edge of the blade, and
    (bb) a wall positioned adjacent one end of said element; and
  (b) resilient means secured to said carrier element having a supporting portion adjacent the other end of said element;
  (c) said supporting portion being adapted to bias the knife blade against said wall when the blade edge is positioned in said channel.

6. A knife blade storage means for a blade having a forward cutting portion and a rearward tang portion, comprising:
  (a) a housing including means defining a socket;
  (b) said socket means including:
    (aa) a wall having a projection formed thereon, and
    (bb) a pair of spaced side walls;
  (c) a blade holder including:
    (aa) a pair of lower walls adapted for close sliding fit between said socket side walls,
    (bb) an upwardly extending channel portion adapted to receive the cutting portion of the knife blade;
    (cc) a resilient element secured to said blade holder having a latch portion adapted to engage said socket wall projection to firmly connect said blade holder in said socket.

7. The storage means recited in claim 6 wherein said blade holder side walls are vertically tapered and wherein said socket side walls include a pair of opposing slots having tapered wall portions to receive said blade holder therebetween.

8. The blade storage means recited in claim 6 wherein said blade holder includes a top wall and wherein said latch element includes a resilient supporting portion spaced from said top wall and adapted to bias a knife blade upwardly against said top wall.

9. The blade storage means recited in claim 7 wherein said blade holder channel portion includes a rear wall and a partial forward wall spaced from said rear wall adjacent said top wall to closely confine a knife blade between said rear wall and said forward wall.

10. A holding and carrying element for a knife blade, the blade having a cutting portion, a tang portion and a deflector element secured thereto, said element comprising:
  (a) a channel portion having a rear wall and a pair of side walls adapted to receive the cutting portion of the blade;
  (b) a top wall adjacent one end of said channel portion;
  (c) a recessed portion adjacent the other end of said channel portion adapted to receive the deflector element;
  (d) a lower wall portion spaced from said top wall approximately the length of the knife blade; and
  (e) a resilient spring element secured to said holder having a free end juxtaposed said lower wall portion and facing said top wall for biasing the knife blade upwardly against said top wall when the cutting portion is positioned in said channel portion.

11. In a storage rack for an electric knife having a handle and a knife blade, said rack having a handle socket for receiving the knife handle, means for supporting the knife blade in the rack comprising:
  (a) a blade holder socket in said rack having a rear wall and an engaging portion; and
  (b) an elongated blade holder adapted for vertical positioning in said blade holder socket and including:
    (aa) a blade receiving portion,
    (bb) a top wall, and
    (cc) means for securing a knife blade in said holder and for preventing relative vertical motion between said blade holder and said rack;
  (c) said securing means having an engaging portion and a resilient supporting portion;
  (d) said engaging portion of said securing means being adapted to ride against said rear wall of said blade holder socket during insertion of said blade holder in said blade holder socket for engagement with said blade holder socket engaging portion when said blade holder is fully seated in said blade holder socket;
  (e) said supporting portion being spaced from the top wall of said blade holder and arranged for resiliently securing the knife blade between said top wall and said supporting portion.

12. In a recharging rack for a rechargeable battery operated electric knife having a handle and a knife blade, said rack having a charging socket for receiving the knife handle, battery charging means, and means for connecting said last-named means to a source of power, means for supporting the knife blade in the rack comprising:
  (a) a blade holder socket having a pair of side walls, a rear wall and a lower recess; and
  (b) an elongated blade holder, adapted for vertical positioning in said blade holder socket and for supporting the blade in a generally vertical position in said socket, including:

(aa) a rearward wall,
(bb) a top wall, and
(cc) a resilient latch element secured to said rearward wall;
(c) said latch element having a rearwardly protruding portion and a supporting portion;
(d) said protruding portion being adapted to ride against said rear wall of said blade holder socket during insertion of said blade holder in said blade holder socket and adapted to project into said lower recess when said blade holder is fully seated in said blade holder socket;
(e) said supporting portion being spaced from the top wall of said blade holder and arranged so that a blade may be secured between said top wall and said supporting portion.

References Cited by the Examiner

UNITED STATES PATENTS

| | | | |
|---|---|---|---|
| 2,609,921 | 9/1952 | Naken | 206—16 |
| 3,005,090 | 10/1961 | Moore | 240—10.6 |
| 3,005,141 | 10/1961 | Emmons | 320—2 |
| 3,109,132 | 10/1963 | Witte | 320—53 |
| 3,143,697 | 8/1964 | Springer | 320—2 |
| 3,194,621 | 7/1965 | Frost | 312—206 |

CLAUDE A. LE ROY, *Primary Examiner.*

K. J. WINGERT, *Assistant Examiner.*